(12) United States Patent
Forrest et al.

(10) Patent No.: US 11,917,944 B2
(45) Date of Patent: Mar. 5, 2024

(54) FOOTREST FOR OUTDOOR POWER EQUIPMENT

(71) Applicant: Ariens Company, Brillion, WI (US)

(72) Inventors: Chris T. Forrest, Manitowoc, WI (US); Kevin A. Spatchek, Greenleaf, WI (US); Courtney Wenzel, Kaukauna, WI (US); Brent P. Berglund, Brillion, WI (US)

(73) Assignee: Ariens Company, Brillion, WI (US)

( * ) Notice: Subject to any disclaimer, the term of this patent is extended or adjusted under 35 U.S.C. 154(b) by 39 days.

(21) Appl. No.: 17/866,123

(22) Filed: Jul. 15, 2022

(65) Prior Publication Data
US 2023/0014119 A1    Jan. 19, 2023

Related U.S. Application Data

(60) Provisional application No. 63/222,871, filed on Jul. 16, 2021.

(51) Int. Cl.
*A01D 67/04* (2006.01)
*A01D 34/00* (2006.01)
*A01D 34/82* (2006.01)
*A01D 101/00* (2006.01)

(52) U.S. Cl.
CPC ........... *A01D 67/04* (2013.01); *A01D 34/001* (2013.01); *A01D 34/82* (2013.01); *A01D 2101/00* (2013.01)

(58) Field of Classification Search
CPC ...... A01D 67/04; A01D 34/001; A01D 34/82; A01D 2101/00; A01D 34/64
See application file for complete search history.

(56) References Cited

U.S. PATENT DOCUMENTS

| 6,442,917 | B1* | 9/2002 | Velke | A01D 34/6806 |
| | | | | 56/14.7 |
| 6,773,049 | B2* | 8/2004 | Rupiper | B60N 2/06 |
| | | | | 296/65.02 |

(Continued)

FOREIGN PATENT DOCUMENTS

| WO | 2003020194 A1 | 3/2003 |
| WO | 2020227684 A1 | 11/2020 |

OTHER PUBLICATIONS

Deere, "Z735E ZTrak Zero Turn Mower," <https://www.deere.com/en/mowers/zero-turn-mowers/z700-series/z735e-ztrak-mower/> accessed Apr. 21, 2021 (6 pages).

(Continued)

*Primary Examiner* — Paul N Dickson
*Assistant Examiner* — Shams Dhanani
(74) *Attorney, Agent, or Firm* — Michael Best & Friedrich LLP (57) ABSTRACT

An outdoor power equipment includes a frame, a cutting deck supported by the frame, a first ground-engaging element coupled to a first portion of the frame, a second ground-engaging element coupled to a second portion of the frame, a suspension system having a first end coupled to the frame and a second end opposite the first end, and an operator platform movable with the suspension system with respect to the frame. The operator platform includes a seat coupled to the second end of the suspension system and a footrest pivotably coupled to the second end of the suspension system.

20 Claims, 8 Drawing Sheets

(56) References Cited

U.S. PATENT DOCUMENTS

| | | | |
|---|---|---|---|
| 6,857,254 B2* | 2/2005 | Melone | B60G 3/01 |
| | | | 56/15.8 |
| 7,543,836 B2 | 6/2009 | Portelance et al. | |
| 8,186,475 B2* | 5/2012 | Sugden | B60N 2/544 |
| 8,419,014 B2 | 4/2013 | Yamagishi et al. | |
| 9,499,204 B1* | 11/2016 | Gust | A01D 34/82 |
| 10,588,256 B2 | 3/2020 | Baena et al. | |
| 10,864,832 B2* | 12/2020 | Stover | B62D 21/03 |
| 2002/0059788 A1* | 5/2002 | Velke | A01D 34/64 |
| | | | 56/14.7 |
| 2002/0194826 A1* | 12/2002 | Schick | A01D 34/662 |
| | | | 56/15.9 |
| 2004/0113388 A1* | 6/2004 | Porter | B60N 3/063 |
| | | | 280/291 |
| 2007/0034435 A1* | 2/2007 | Berg | B62J 25/04 |
| | | | 180/190 |
| 2008/0202874 A1* | 8/2008 | Scheele | B62D 33/0604 |
| | | | 188/297 |
| 2017/0341685 A1* | 11/2017 | Andre | B62D 27/04 |
| 2019/0098830 A1* | 4/2019 | Baena | B60N 3/06 |
| 2020/0022303 A1* | 1/2020 | Gindt | A01D 34/824 |
| 2020/0029502 A1* | 1/2020 | Hultgren | A01D 43/063 |
| 2020/0120871 A1* | 4/2020 | Woodrum | A01D 34/64 |
| 2022/0169155 A1* | 6/2022 | Berglund | B60N 2/54 |
| 2022/0227262 A1* | 7/2022 | Aldridge | B62D 1/12 |
| 2022/0379781 A1* | 12/2022 | Kucera | B62D 51/02 |
| 2023/0105559 A1* | 4/2023 | Wang | H01M 50/204 |
| | | | 180/68.5 |
| 2023/0231436 A1* | 7/2023 | Schuller-Rach | H02K 7/085 |
| | | | 56/17.5 |
| 2023/0256876 A1* | 8/2023 | Wright | A01D 34/00 |
| | | | 296/65.05 |

OTHER PUBLICATIONS

Walker, "Adjustable Footrests," <https://www.walker.com/addons/adjustable-footrests> accessed Apr. 21, 2021 (13 pages).

* cited by examiner

FOOTREST FOR OUTDOOR POWER EQUIPMENT

CROSS-REFERENCE TO RELATED APPLICATIONS

This application claims priority to co-pending U.S. Provisional Patent Application No. 63/222,871 filed on Jul. 16, 2021, the entire content of which is incorporated herein by reference.

FIELD OF THE INVENTION

The present invention relates to outdoor power equipment (e.g., lawn mowers, tractors, utility task vehicles (UTVs), loaders, etc.) and, more particularly, to a footrest for the outdoor power equipment.

SUMMARY

In one embodiment, the invention provides an outdoor power equipment including a frame, a cutting deck supported by the frame, a first ground-engaging element coupled to a first portion of the frame, a second ground-engaging element coupled to a second portion of the frame, a suspension system having a first end coupled to the frame and a second end opposite the first end, and an operator platform movable with the suspension system with respect to the frame. The operator platform including a seat coupled to the second end of the suspension system, and a footrest pivotably coupled to the second end of the suspension system.

In one embodiment, the invention provides the outdoor power equipment including a frame, a cutting deck supported by the frame, a first ground-engaging element coupled to a first portion of the frame, a second ground-engaging element coupled to a second portion of the frame, a suspension system having a ground side coupled to the frame and a sprung side opposite the ground side, and an operator platform movable with the suspension system. The operator platform including a seat coupled to a seat plate that is pivotably coupled to the sprung side of the suspension system, and a footrest pivotably coupled to the sprung side of the suspension system. The footrest and the seat are pivotable about a single pivot point.

In one embodiment, the invention provides the outdoor power equipment including a frame, a cutting deck supported by the frame, a first ground-engaging element coupled to a first portion of the frame, a second ground-engaging element coupled to a second portion of the frame, a support structure coupled to the frame and an operator platform coupled to the frame by the support structure. The operator platform including a seat coupled to the support structure, and a footrest defining a support surface. The footrest pivotably coupled to the support structure about a pivot point positioned a vertical position between the seat and the support surface.

In one embodiment, the invention provides a footrest for the outdoor power equipment having a frame that supports a seat. The footrest including a first footrest portion supported relative to the frame, the first footrest portion defining a first support surface, a second footrest portion defining a second support surface, the second footrest portion being movably coupled to the first footrest portion; and an adjustment mechanism positioned between the first and second footrest portions to adjust a position of the second footrest portion between a first position where the second footrest portion is closest to the seat, a second position where the second footrest portion is farthest from the seat, and infinitely between the first and second positions.

In one embodiment, the invention provides the outdoor power equipment including a frame, a cutting deck supported by the frame, a first ground-engaging element coupled to a first portion of the frame, a second ground-engaging element coupled to a second portion of the frame, a support structure coupled to the frame, and an operator platform coupled to the support structure. The operator platform including a seat coupled to the support structure, and a footrest coupled to the support structure. The footrest including a first footrest portion supported relative to the frame, the first footrest portion defining a first support surface, a second footrest portion defining a second support surface, the second footrest portion being movably coupled to the first footrest portion, and an adjustment mechanism positioned between the first and second footrest portions to adjust a position of the second footrest portion between a first position where the second footrest portion is closest to the seat, a second position where the second footrest portion is farthest from the seat, and infinitely between the first and second positions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. As used herein, terms relating to position (e.g., front, rear, left, right, etc.) are relative to an operator situated on an outdoor power equipment during normal operation of the outdoor power equipment.

Figure 1:
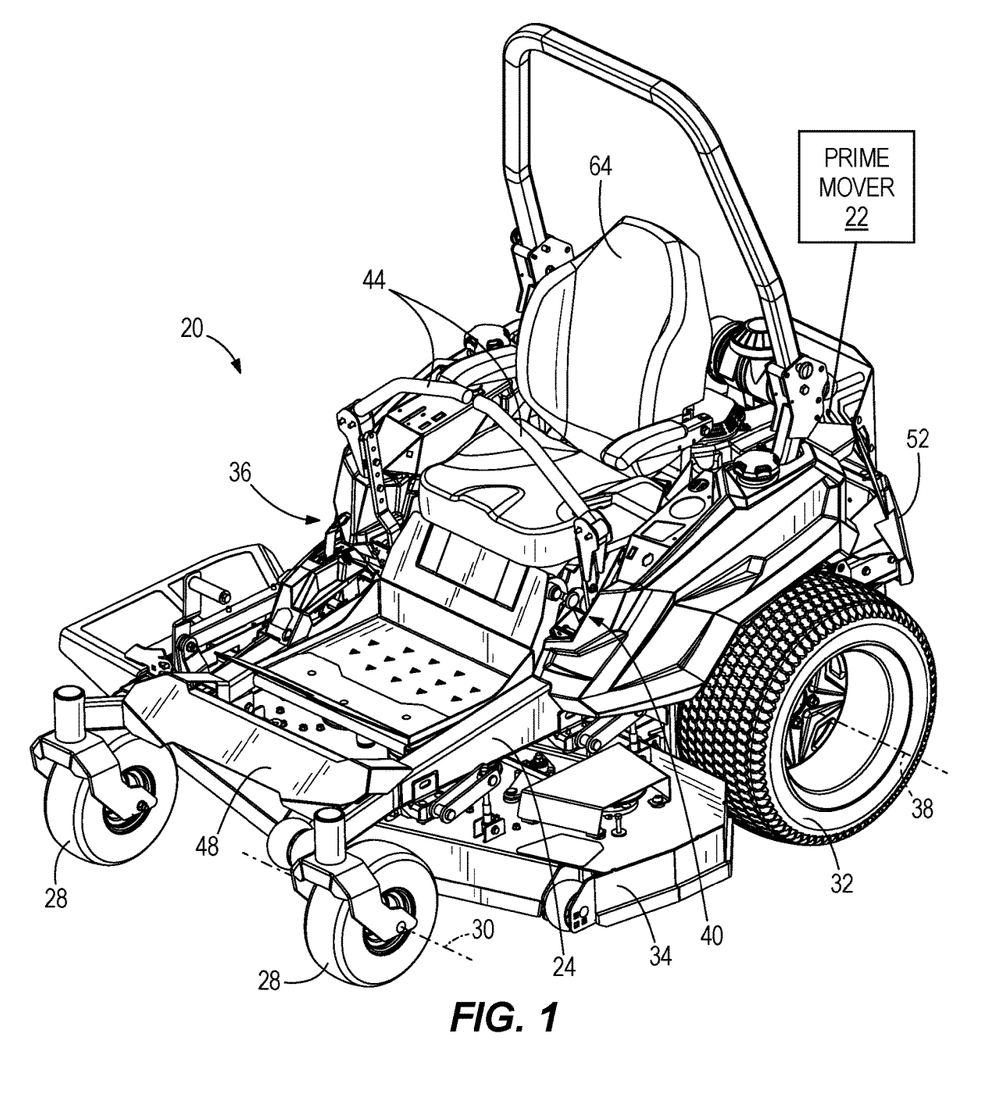
FIG. 1 is a top, front, left perspective view of an outdoor power equipment having a suspension system.
Figure 2:
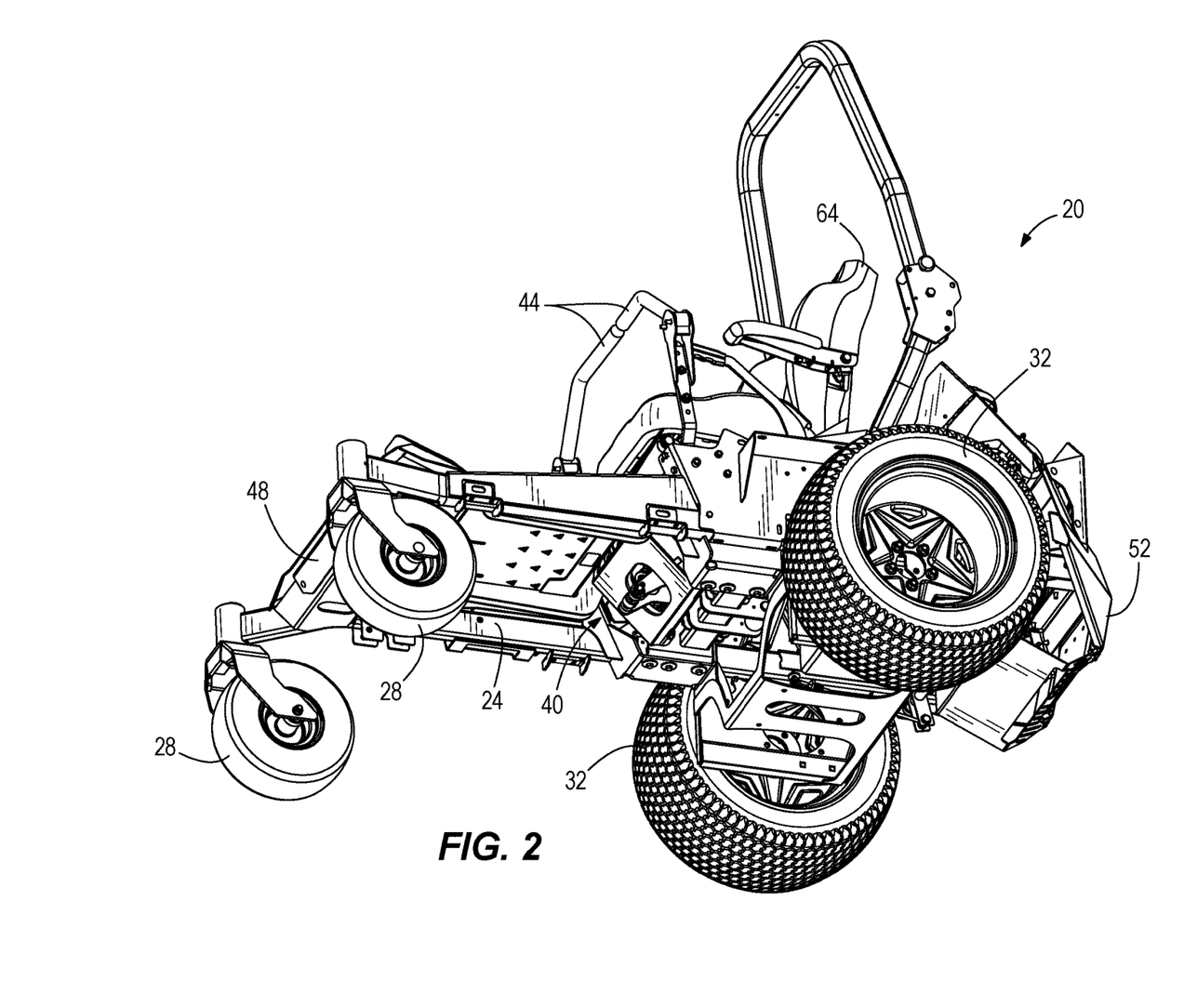
FIG. 2 is a bottom, front, left perspective view of the outdoor power equipment.

FIGS. 1 and 2 illustrate an outdoor power equipment (OPE) 20 in the form of a riding zero turning radius lawn mower. In other embodiments, the outdoor power equipment 20 is a tractor, a UTV, a loader, or another type of OPE. The illustrated outdoor power equipment 20 includes a frame 24, a plurality of ground-engaging elements 28, 32 coupled to the frame 24, an operator platform 36 supported by the frame 24, and a suspension system 40 connecting the operator platform 36 to the frame 24. The outdoor power equipment 20 includes a prime mover 22 (e.g., an engine, a motor and battery, etc.) supported by the frame 24 and operatively coupled to the ground-engaging elements 28, 32. The prime mover 22 (schematically shown) is also operatively coupled to a work implement coupled to the frame 24. The work implement of the illustrated embodiment is a cutting deck 34. In other embodiments, the work implement is a spreader, a yard vacuum, a plow, or other work implement suitable for the type of outdoor power equipment 20 and work being performed.

The illustrated outdoor power equipment 20 also includes operator controls 44. The operator controls 44 are coupled to the frame 24 adjacent the operator platform 36. The operator controls 44 are operable to control the speed and direction of the ground-engaging elements 28, 32 through a drive mechanism (e.g., a transmission, an electric motor, etc.) to move and/or turn the outdoor power equipment 20. In the illustrated embodiment, the operator controls 44 include two handles used for a zero turn radius (ZTR) lawn mower. In other embodiments, the operator controls 44 include other suitable actuators, such as a steering wheel, joystick(s), and the like.

The frame 24 includes a first or front portion 48 and a second or rear portion 52 opposite the front portion 48. The frame 24 defines the overall body structure of the outdoor power equipment 20 and supports the other components of the outdoor power equipment 20. The prime mover 22 is supported on the rear portion 52 of the frame 24, behind the operator platform 36. In the illustrated embodiments the cutting deck 34 hangs from the frame 24 underneath the frame 24 between the front and rear portions 48, 52.

The ground-engaging elements 28, 32 are movably (e.g., rotatably) coupled to the frame 24. The illustrated ground-engaging elements 28, 32 include two first ground-engaging elements 28 coupled to the front portion 48 of the frame 24, and two second ground-engaging elements 32 coupled to the rear portion 52 of the frame 24. The first ground-engaging element 28 rotates about a first drive axis 30 (FIG. 1) that extends centrally through the first ground-engaging element 28. The second ground-engaging element 32 rotates about a second drive axis 38 (FIG. 1) that extends centrally through the second ground-engaging element 32. In the illustrated embodiment, the ground-engaging elements 28, 32 are wheels. In other embodiments, the outdoor power equipment 20 includes other types of ground-engaging elements, such as track drives. The first ground-engaging elements 28 are idle wheels that are not driven by the prime mover 22, while the second ground-engaging elements 32 are driven wheels that are operatively coupled to the prime mover 22. In other embodiments, the first ground-engaging elements 28 are also or alternatively driven wheels that are operatively coupled to the prime mover 22.

The operator platform 36 is supported relative the frame 24 and located between the front portion 48 and the rear portion 52. For example, the operator platform 36 of the illustrated outdoor power equipment 20 is defined as the structure that supports the operator's posterior when the operator is seated in a seat 64. In other embodiments, such as stand up outdoor power equipment, the operator platform 36 is defined as the structure that supports the operator's feet relative to the frame 24.

The suspension system 40 supports the operator platform 36 on the frame 24. The suspension system 40 allows the operator platform 36 to move relative to the frame 24 when, for example, the outdoor power equipment 20 is traveling over uneven or bumpy terrain. The suspension system 40 can take the form of the suspension system described and illustrated in co-owned International Application No. PCT/US2020/032227, filed May 8, 2020, which is incorporated herein by reference in its entirety. The suspension system 40 includes a first end coupled to the frame 24 and a second end opposite the first end. In the illustrated embodiment, the first end defines a ground side of the suspension system 40 and the second end defines a sprung side that is movable relative to the frame 24. The sprung side of the suspension system 40 includes a support structure 105 (FIG. 4) that the operator platform 36 is coupled to. In the illustrated embodiment, the operator platform 36 is coupled to the support structure 105 on the sprung side of the suspension system 40 such that the operator platform 36 defines a sprung mass. In other words, the operator platform 36 is supported by and movable with the suspension system 40. In other embodiments, the OPE 20 may not include a suspension system 40. In such an embodiment, the support structure 105 may be rigidly coupled to the frame 24 or defined by the frame 24.

Figure 4:
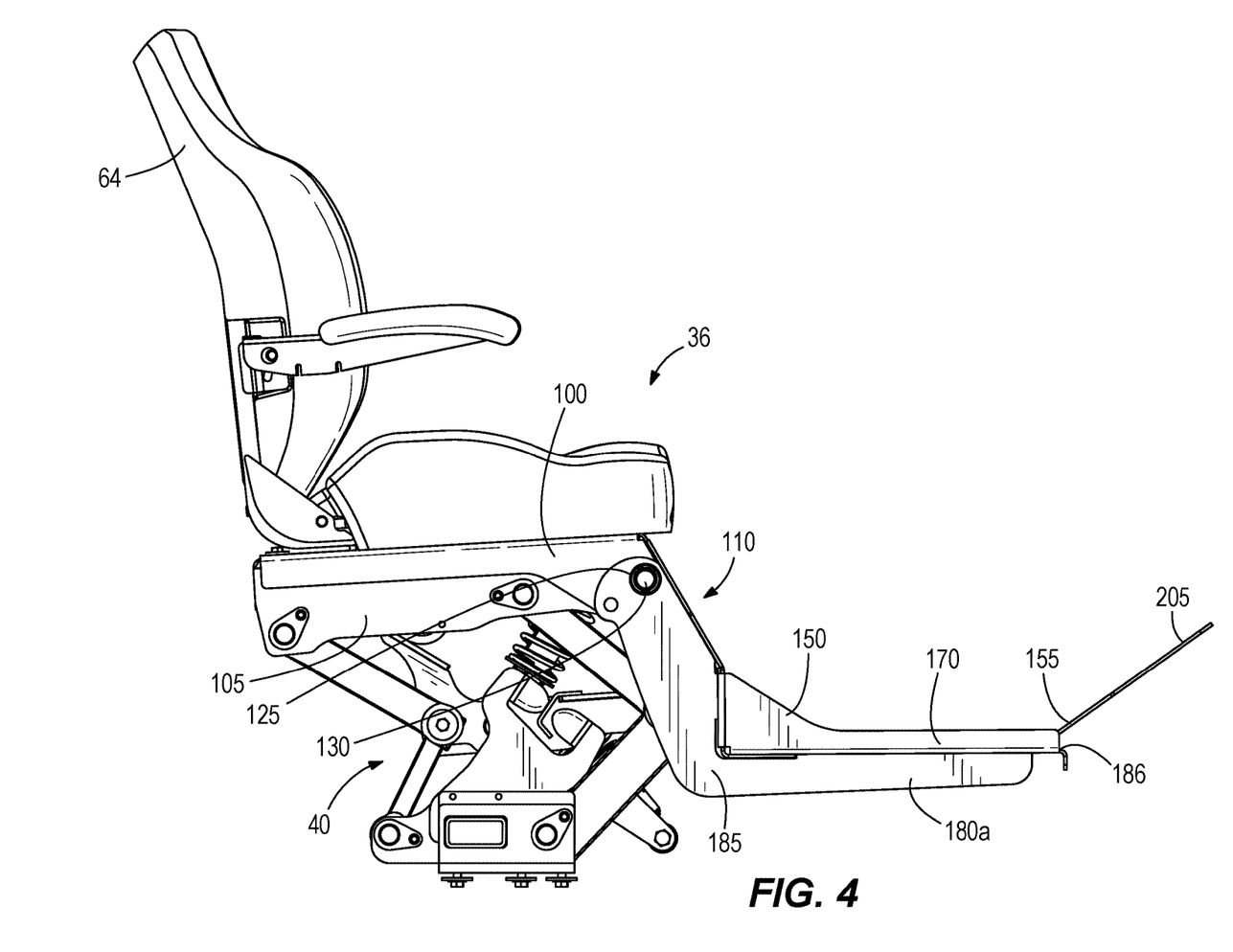
FIG. 4 is a right, side view of a portion of the outdoor power equipment, illustrating the footrest in an operating position.
Figure 5:
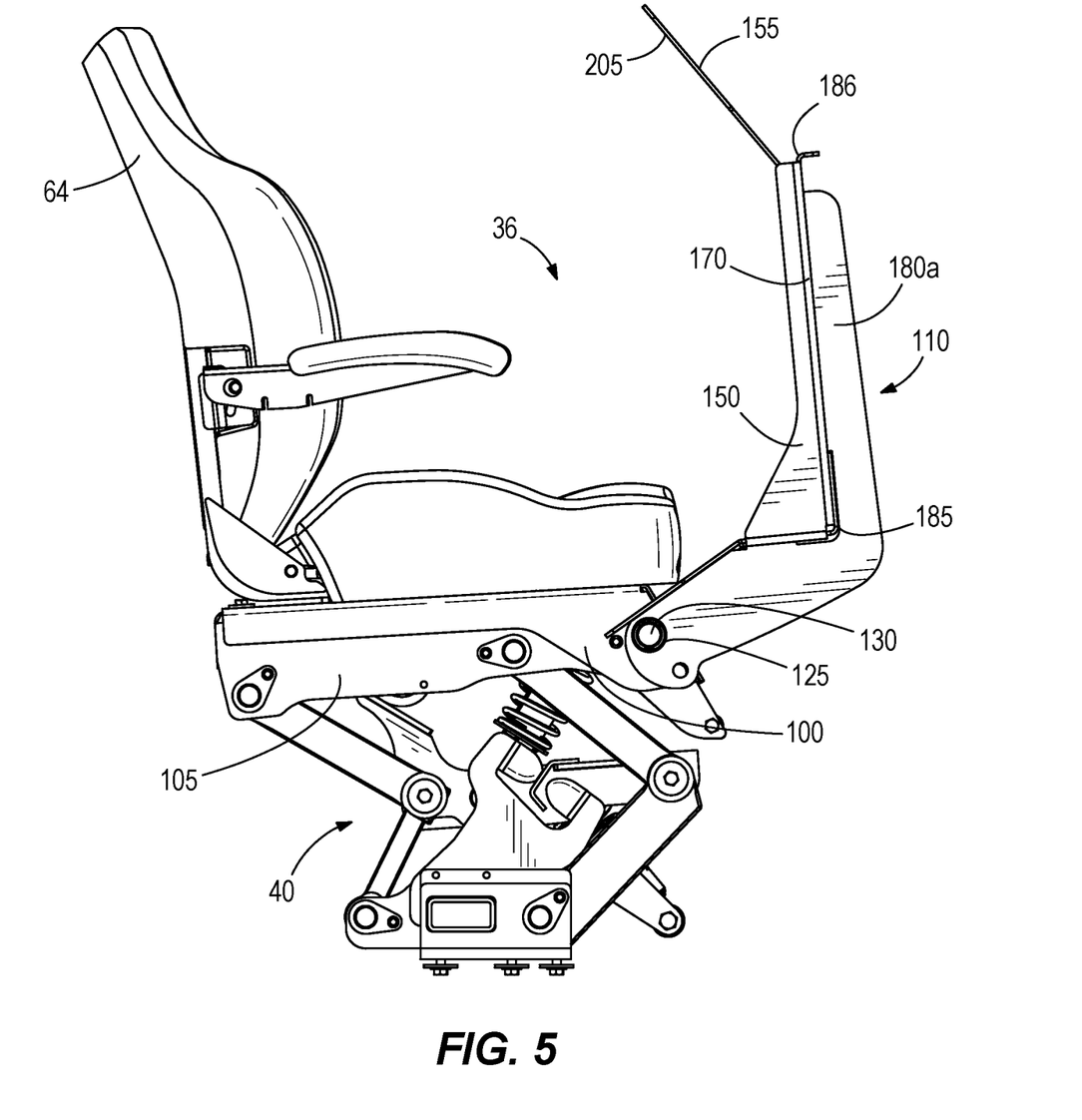
FIG. 5 is a right, side view of the portion of the outdoor power equipment of FIG. 4, illustrating the footrest in a maintenance position.
Figure 6:
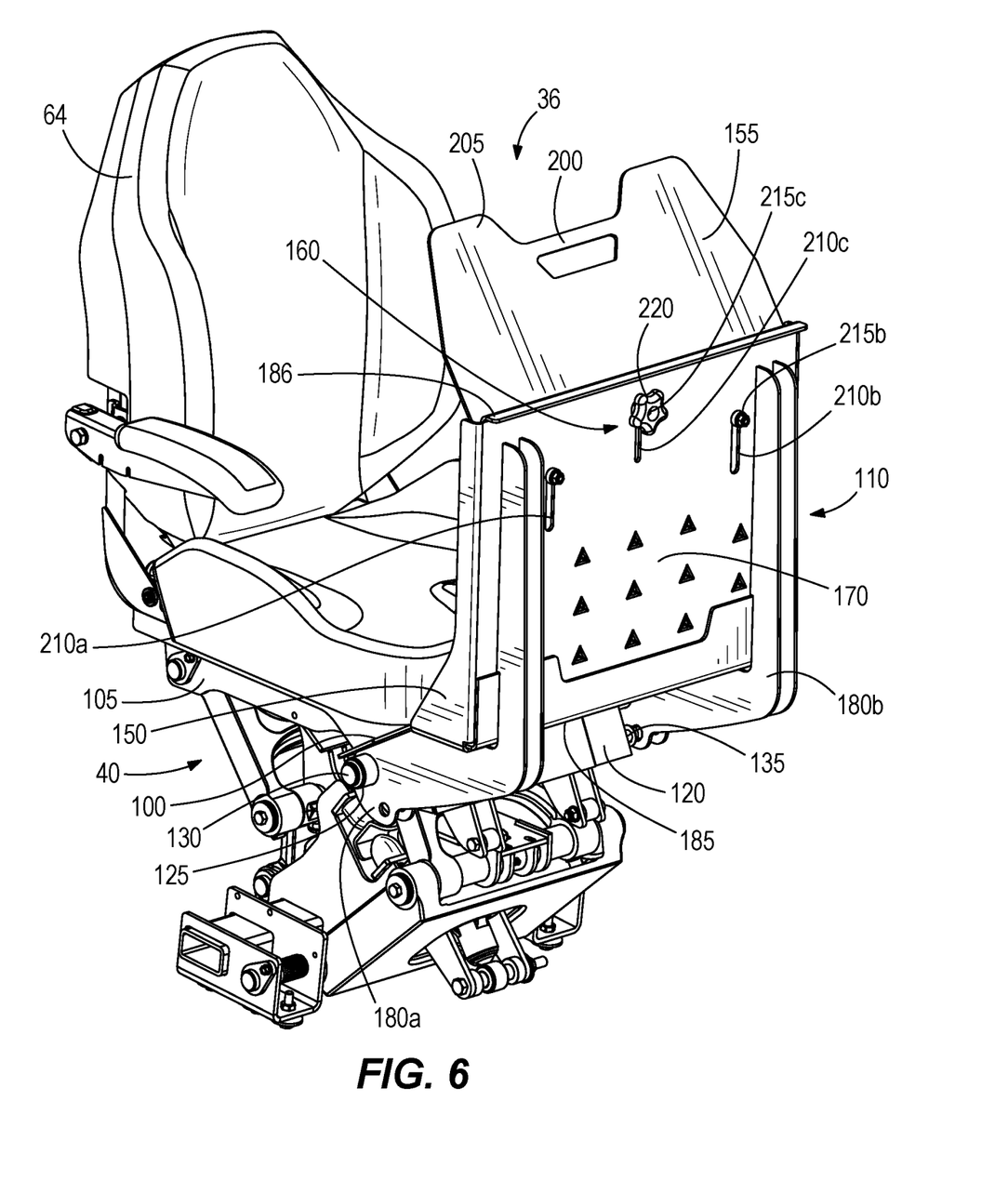
FIG. 6 is a perspective view of the portion of the outdoor power equipment of FIG. 4, illustrating the footrest in the footrest maintenance position.

As shown in FIGS. 4-7, the operator platform 36 includes a seat plate 100 pivotably coupled to the support structure 105 on the sprung side of the suspension system 40, a seat 64 coupled to the seat plate 100, a footrest 110 pivotably coupled to the support structure 105 on the sprung side of the suspension system 40, and a latch 115 (FIG. 7) coupled to the footrest 110, which permits and restricts movement of the footrest 110. In the illustrated embodiment, a front edge 120 of the seat plate 100 and the footrest 110 are each pivotably coupled to the support structure 105 via a shaft 125 and movable about a pivot point 130 (FIG. 6). In other words, the shaft 125 couples the footrest 110 and the seat plate 100 on the sprung side such that the footrest 110 and the seat plate 100 share a common pivot point 130. In some embodiments, the footrest 110 and the seat plate 100 rest against rubber stops to provide vibration damping and accommodate manufacturing variations. In some embodiments, the shaft 125 includes plastic bearings at each interface to reduce vibration transmission and noise.

The pivot point 130 is positioned adjacent a front edge of the support structure 105 and the seat 64. In the illustrated embodiment, the footrest 110 has a generally L-shaped construction such that the pivot point 130 is positioned at a vertical position between a first support structure 170 (described in more detail below) of the footrest 110 and the seat 64. In other embodiments, the pivot point 130 is positioned adjacent a back edge of the support structure 105 or in between the front edge of the support structure 105 and the back edge of the support structure 105. In other embodiments, the seat plate 100 and the footrest 110 pivot about separate pivot points on the support structure 105 of the suspension system 40.

Figure 8:
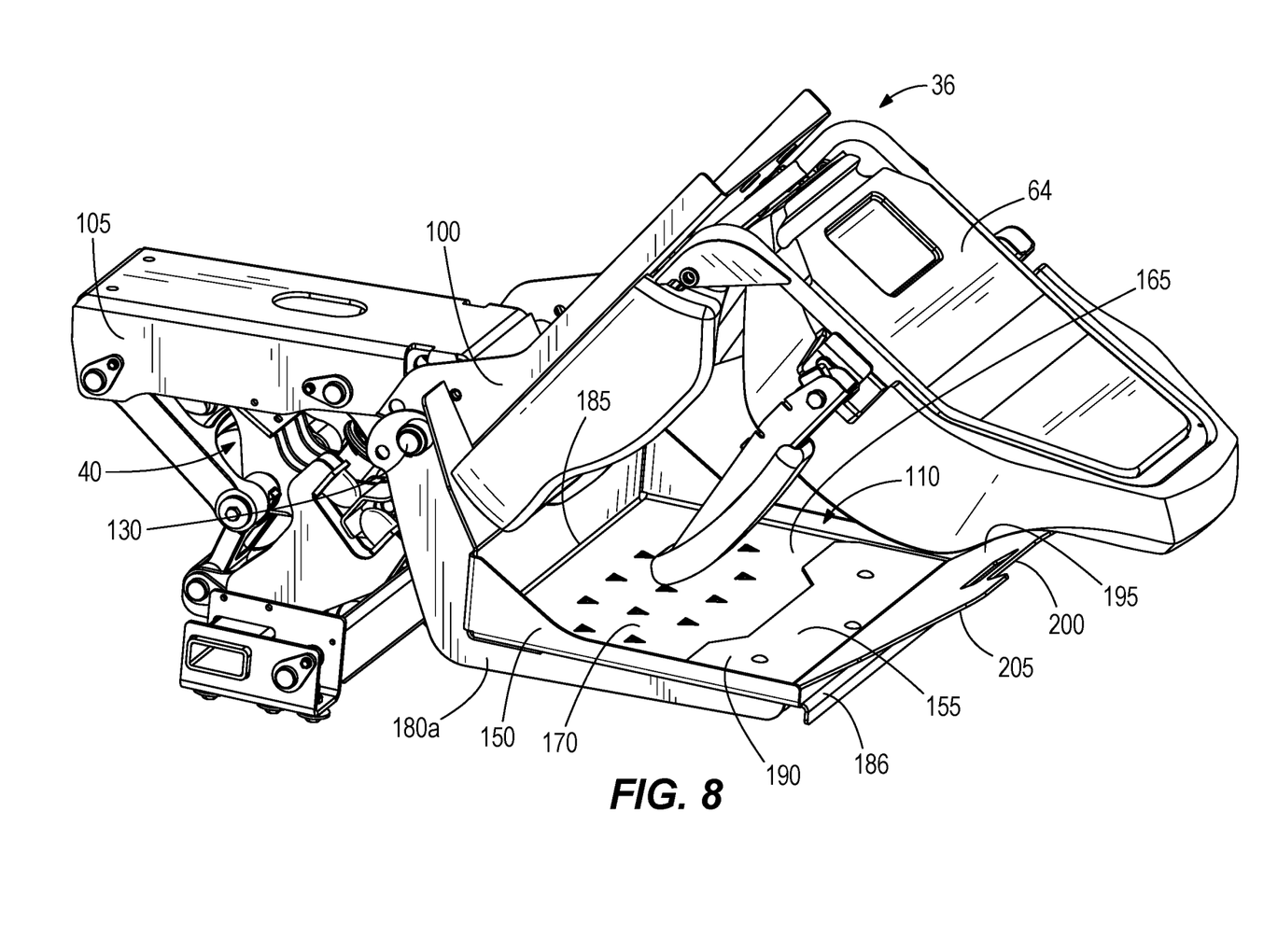
FIG. 8 is a perspective view of a portion of the outdoor power equipment, illustrating a seat of the outdoor power equipment in a maintenance position.

The seat 64 is coupled to and pivotable with the seat plate 100. The seat plate 100 is pivotably coupled to the support structure 105 via the shaft 125 at the pivot point 130 and is movable between an operating position (FIGS. 3-6) and a maintenance or transport position (FIG. 8). In the operating position, the seat plate 100 lies above and is secured to the support structure 105 of the suspension system 40. The seat plate 100 pivots about the shaft 125 to move the seat 64 from the operating position to the maintenance or transport position. In the maintenance or transport position, the seat 64 is positioned over or hangs over the footrest 110, which reduces the overall height of the OPE 20 and allows the user to access the suspension system 40. In some embodiments, the seat plate 100 includes a securing mechanism (e.g., a latch, etc.) that selectively secures the seat plate 100 to the support structure 105. For example, in such embodiments the securing mechanism is positioned opposite the pivot point 130 (e.g., on a rear portion of the seat plate 100). In other embodiments, the seat plate 100 does not include a securing mechanism.

Figure 7:
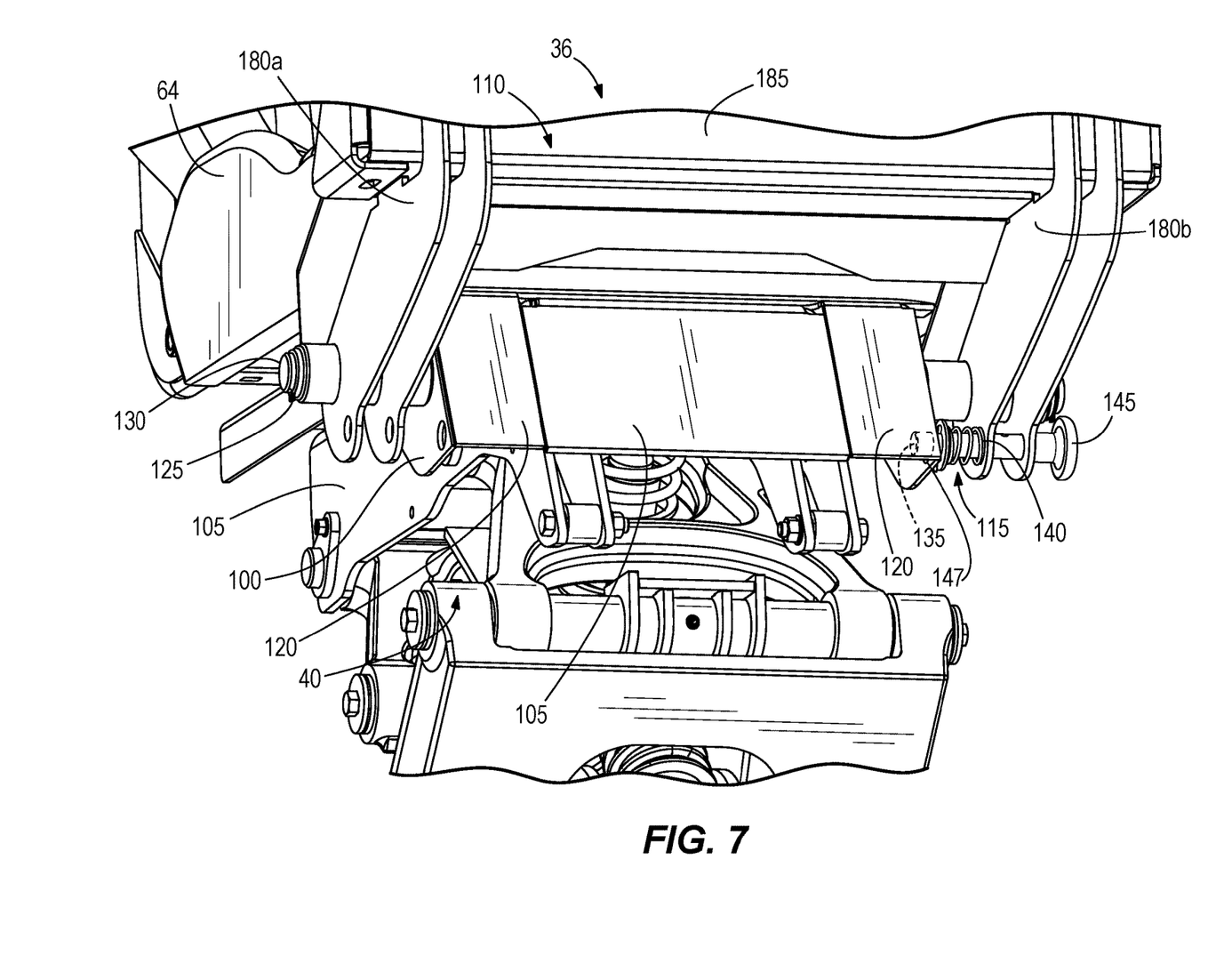
FIG. 7 is a perspective view of a portion of the outdoor power equipment, illustrating a latch for selectively permitting and restricting pivotable movement of the footrest.

The footrest 110 is pivotably coupled to the support structure 105 via the shaft 125 at the pivot point 130 and is movable between an operating position (FIGS. 3 and 4) and a maintenance position (FIGS. 5-7) in response to the position of the latch 115 (FIG. 7). In the operating position, the footrest 110 at least partially covers the cutting deck 34. In the illustrated embodiment, the latch 115 includes a rod 135, a spring 140 that biases the rod 135 towards a first, extended position (FIG. 7), and a knob 145 coupled to the rod 135. When the footrest 110 is in the operating position, the spring 150 is compressed such that the rod 135 of the latch 115 is in a second, retracted position where the rod 135 abuts the side surface of the seat plate 100. In some embodiments, the abutment between the rod 135 and the side surface of the seat plate 100 forms a frictional force on the seat plate 100 to restrict movement of the footrest 110.

To move the footrest 110 from the operating position to the maintenance position, the operator grasps the footrest 110 and moves the footrest 110 about the pivot point 130 (e.g., against the frictional force of the latch 115). When the footrest 110 reaches the maintenance position (FIG. 6), the spring 140 biases the rod 135 of the latch 115, from the second, retracted position to the first, extended position. In other words, the operator is able to move the footrest 110 to the operating position without manipulating the latch 115. In the maintenance position, the rod 135 aligns with a recess 147 formed in the seat plate 100 and the spring 140 biases the rod 135 towards the extended position and into engagement with the recess 147. As a result, the latch 115 secures the footrest 110 in the maintenance position until the latch 115 is moved back to the second, retracted position. In other embodiments, the rod 135 may engage the front edge 120 of the seat plate 100 (FIG. 7) to secure the footrest in the maintenance position. In some embodiments, a second recess may be formed in the seat plate 100 and the rod 135 may be seated within the second recess to inhibit rotation of the footrest 110 when the footrest 110 is in the operating position.

When the footrest 110 is pivoted to the maintenance position, the cutting deck 34 is partially or entirely exposed, which allows the suspension system 40 and the cutting deck 34 to be more easily accessible (e.g. more exposed) than when the footrest 110 is in the operating position. In other words, the footrest 110 covers less of the suspension system 40 and the cutting deck 34 in the maintenance position than in the operating position. In the illustrated embodiment, the footrest 110 covers the portion of the cutting deck 34 positioned below a frame footprint defined between the second ground-engaging members 28 when the footrest 110 is in the operating position. In the maintenance position, the footrest 110 exposes the portion of the cutting deck 34 positioned within the frame footprint.

To move the footrest 110 from the maintenance position to the operating position, the latch 115 is adjusted to the second, retracted position that permits rotational motion of the footrest 110. For example, in the illustrated embodiment the operator grasps the knob 145 and pulls the knob 145 outward (e.g., away from the footrest 110), which compresses the spring 140 and allows the rod 135 to disengage with the recess 147 of the seat plate 100. In the second position, the latch 115 permits rotation of the footrest 110 about the pivot point 130. In other embodiments, alternative mechanisms (e.g., prop rods, etc.) other than the latch 115 are used to selectively inhibit rotation of the footrest 110.

With continued reference to FIGS. 3-6, the footrest 110 includes a first footrest portion 150 coupled to the support structure 105 and a second footrest portion 155 movably coupled to the first footrest portion 150 by an adjustment mechanism 160 (FIG. 6). The first footrest portion 150 includes a generally horizontal component having a first support surface 170 (FIG. 3) and a generally vertical component. In other words, the first footrest portion 150 has a generally L-shape structure. The first footrest portion 150 further includes first and second footrest coupling arms 180a, 180b (FIG. 6) that are coupled to the support structure 105 via the shaft 125. In the illustrated embodiment, the first and second footrest coupling arms 180a, 180b are positioned on opposing sides (e.g., right and left sides) of the first footrest portion 150. In other embodiments, the first and second footrest coupling arms 180a, 180b may individually or collectively have an alternative shape, size, and/or function from the present embodiment.

Figure 3:
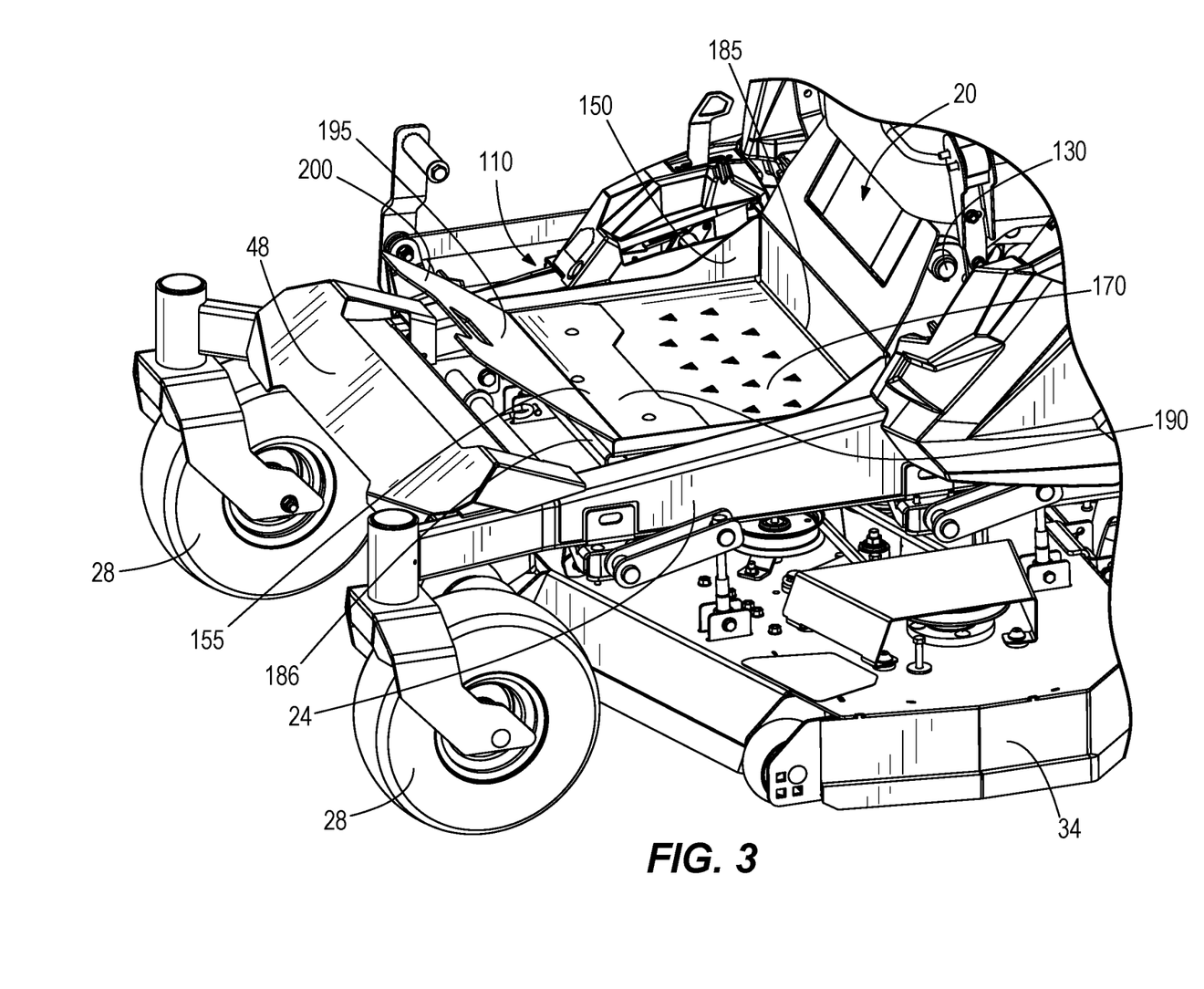
FIG. 3 is a top, front, left perspective view of a portion of the outdoor power equipment, illustrating a footrest in a footrest operating position.

The first and second footrest coupling arms 180a, 180b support the first support surface 170 (FIG. 4), which is oriented roughly parallel to the frame 24 of the outdoor power equipment 20 when the footrest 110 is in the operating position (FIGS. 3-5). The first support surface 170 may support an operator when the operator is entering the operator platform 36 or when the operator is seated in the seat 64. In the illustrated embodiment, the footrest coupling arms 180b, 180b are coupled to an underside of the first support surface 170. In other embodiments, the footrest coupling arms 180a, 180b are coupled to a topside of the first support surface 170, or the footrest coupling arms 180a, 180b are respectively coupled to left and right side surfaces of the first support surface 170.

A first end 185 of the first support surface 170 is proximate the pivot point 130 (FIG. 4) of the operator platform 36 and a second end 186 of the first support surface 170 is positioned opposite the first end 185 of the first support surface 170. In the illustrated embodiment, a horizontal distance defined between the pivot point 130 and the second end 186 of the first support surface 170 is greater than a coinciding vertical distance between the first end 185 of the first support surface 170 and the pivot point 130. In other words, the horizontal component of the first footrest portion 150 is greater than the vertical component of the first footrest portion 150. In other embodiments, the horizontal distance is equal to or less than the coinciding vertical distance.

The second footrest portion 155 is movably coupled (e.g., in a fore and aft position) to the first footrest portion 150 by means of the adjustment mechanism 160 (FIG. 6). The second footrest portion 155 defines an attachment portion 190 (FIG. 3) that is coupled to the first footrest portion 150 and a second support surface 195 that is inclined relative to the attachment portion 190 and the first footrest portion 150. In the illustrated embodiment, the second support surface 195 is inclined at an angle of approximately 45 degrees. In other embodiments, the angle is in a range of 10 to 90 degrees. The second footrest portion 155 further includes a handle portion 200 integrally formed on a distal end 205 of the second support surface 195. For example, the handle portion 200 is grasped by the operator to facilitate movement of the second footrest portion 155 relative to the first footrest portion 150. Additionally, the handle portion 200 is grasped by the operator to facilitate the pivotable movement of the footrest 110 between the operating and maintenance positions, as described above.

As shown in FIG. 6, the adjustment mechanism 160 is positioned on an underside of the footrest 110 and extends between the first and second footrest portions 150, 155. The positioning of the adjustment mechanism 160 on the underside of the footrest 110 eliminates potential tripping hazards on the support surfaces 170, 195 of the footrest 110. The adjustment mechanism 160 is used to adjust the position of the second footrest portion 155 between a first position where the second footrest portion 155 is closest to the seat 64 (e.g., when the footrest 110 and the seat 64 are in the operating position), a second position where the second footrest portion 155 is farthest from the seat 64, and infinitely between the first and second positions. In other words, the adjustment mechanism 160 allows the second footrest portion 155 to be movable relative to the first footrest portion 150 along a single degree of adjustment relative to the seat 64. Other embodiments may include more footrest portions or less footrest portions that increase or decrease the degree and magnitude of adjustment possible within the footrest 110.

As shown in FIG. 6, the adjustment mechanism 160 includes slots 210a (schematically shown), 210b, 210c formed within the first support surface 170, fasteners 215a, 215b, 215c coupled to the second footrest portion 155 and extending through the slots 210a, 210b, 210c, and a securing knob 220 coupled to one or more of the fasteners 215a, 215b, 215c to selectively provide a clamping force between the first and second footrest portions 150, 155. In the illustrated embodiment, the adjustment mechanism 160 includes a first slot 210a positioned proximal the first footrest coupling arm 180a, a second slot 210b positioned proximal the second footrest coupling arm 180b, and a third slot 210c positioned between the first and second slots 210a, 210b. The slots 210a, 210b, 210c are each positioned adjacent the second end 186 of the first support surface 170. In the illustrated embodiment, the slots 210a, 210b, 210c are positioned closer to the second end 186 of the first support surface 170 than the first end 185 of the first support surface 170.

The slots 210a, 210b, 210c are each configured to receive respective fasteners 215a, 215b, 215c. For example, the fasteners 215a, 215b received in the first and second slots 210a, 210b are flanged spacers and the fastener 215c in the third slot 210c threadably receives the securing knob 220. In some embodiments, there are fewer fastener receiving slots (e.g., one or two) or more fastener receiving slots (e.g., four, five, etc.) formed on the first support surface 170. In further embodiments, a slot is positioned infinitely between the first end 185 of the first support surface 170 and the second end 186 of the first support surface 170. In other embodiments, alternate adjusting mechanisms are used to secure, unsecure, and infinitely adjust the second footrest portion 155 relative to the first footrest portion 150.

To adjust the position of the second footrest portion 155 relative to the first footrest portion 150, the footrest 110 is moved to the maintenance position to provide access to the securing knob 220. The operator may then loosen the securing knob 220, which allows the second footrest portion 155 to move relative to the first footrest portion 150 and the fasteners 215a, 215b, 215c to slide along the slots 210a, 210b, 210c in the fore and aft direction. In the illustrated embodiment, the compression limiters 215a, 215b positioned within the first and second slots 210a, 210b restrict lateral movement of the second footrest portion 155 and ensures alignment between the first and second footrest portions 150, 155. The second footrest portion 155 is then secured in place as a result of tightening the securing knob 220. In some embodiments, the adjustment mechanism 160 further includes markings to indicate the position of the second footrest portion 155.

Various features and advantage of the invention are set forth in the following claims.

What is claimed is:

1. An outdoor power equipment comprising:
a frame;
a cutting deck supported by the frame;
a first ground-engaging element coupled to a first portion of the frame;
a second ground-engaging element coupled to a second portion of the frame;
a suspension system having a first end coupled to the frame and a second end opposite the first end; and
an operator platform movable with the suspension system with respect to the frame, the operator platform including:
a seat coupled to the second end of the suspension system, and
a footrest pivotably coupled to the second end of the suspension system.

2. The outdoor power equipment of claim 1, wherein the footrest is pivotable about a pivot point between an operating position where the footrest covers at least a portion of the cutting deck and a maintenance position where the at least portion of the cutting deck is at least partially exposed.

3. The outdoor power equipment of claim 2, further comprising a latch movable between a first position that secures the footrest in the maintenance position and a second position that permits movement of the footrest.

4. The outdoor power equipment of claim 2, wherein the pivot point is positioned adjacent a front edge of the seat.

5. The outdoor power equipment of claim 2, wherein the seat is coupled to a seat plate that is pivotably coupled to the second end of the suspension system.

6. The outdoor power equipment of claim 5, wherein the seat plate and the footrest are pivotable about the same pivot point.

7. The outdoor power equipment of claim 1, wherein:
the footrest includes a first footrest portion defining a first support surface and a second footrest portion defining a second support surface, and
the second footrest portion is movably coupled to the first footrest portion with an adjustment mechanism.

8. The outdoor power equipment of claim 7, wherein the first footrest portion includes an L-shaped geometry.

9. The outdoor power equipment of claim 7, wherein the second footrest portion is adjustable with the adjustment mechanism between a first position where the second footrest portion is closest to the seat, a second position where the second footrest portion is farthest from the seat, and infinitely between the first and second positions.

10. The outdoor power equipment of claim 7, wherein the adjustment mechanism includes a slot formed within the first footrest portion and a securing knob positioned on an underside of the footrest to selectively provide a clamping force between the first and second footrest portions.

11. An outdoor power equipment comprising:
a frame;
a cutting deck supported by the frame;

a first ground-engaging element coupled to a first portion of the frame;

a second ground-engaging element coupled to a second portion of the frame;

a suspension system having a ground side coupled to the frame and a sprung side opposite the ground side; and an operator platform movable with the suspension system, the operator platform including:

a seat coupled to a seat plate that is pivotably coupled to the sprung side of the suspension system, and a footrest pivotably coupled to the sprung side of the suspension system, wherein the footrest and the seat are pivotable about a single pivot point.

12. The outdoor power equipment of claim 11, wherein the footrest includes a first footrest portion defining a first support surface and a second footrest portion defining a second support surface, and the second footrest portion is movably coupled to the first footrest portion with an adjustment mechanism.

13. The outdoor power equipment of claim 12, wherein the second footrest portion is adjustable with the adjustment mechanism between a first position where the second footrest portion is closest to the seat, a second position where the second footrest portion is farthest from the seat, and infinitely between the first and second positions.

14. The outdoor power equipment of claim 12, wherein the adjustment mechanism includes a slot formed within the first footrest portion and a securing knob positioned on an underside of the footrest to selectively provide a clamping force between the first and second footrest portions.

15. The outdoor power equipment of claim 11, wherein the footrest is pivotable about a pivot point between an operating position where the footrest covers at least a portion of the cutting deck and a maintenance position where the at least portion of the cutting deck is at least partially exposed.

16. The outdoor power equipment of claim 11, wherein the seat is pivotable about the pivot point between an operating position where the seat is supported in an upright position on the sprung side of the suspension system and a transportation position where the sprung side of the suspension system is at least partially exposed.

17. An outdoor power equipment comprising:

a frame;

a cutting deck supported by the frame;

a first ground-engaging element coupled to a first portion of the frame;

a second ground-engaging element coupled to a second portion of the frame;

a support structure coupled to the frame; and an operator platform coupled to the frame by the support structure, the operator platform including:

a seat coupled to the support structure, and a footrest defining a support surface, the footrest pivotably coupled to the support structure about a pivot point positioned at a vertical position between the seat and the support surface.

18. The outdoor power equipment of claim 17, wherein the footrest is pivotable about a pivot point between an operating position where the footrest covers at least a portion of the cutting deck and a maintenance position where the at least portion of the cutting deck is at least partially exposed.

19. The outdoor power equipment of claim 18, wherein the seat is coupled to a seat plate that is pivotably coupled to the support structure, and wherein the seat plate and the footrest are pivotable about the same pivot point.

20. The outdoor power equipment of claim 17, wherein the pivot point is positioned adjacent a front edge of the seat.

* * * * *